United States Patent [19]

Malkin

[11] E Re. 29,354

[45] Reissued Aug. 16, 1977

[54] ELECTRIC NAILER

[75] Inventor: Bruce Malkin, Norwalk, Conn.

[73] Assignee: Electro-Speed Tool Corporation, Norwalk, Conn.

[21] Appl. No.: 686,322

[22] Filed: May 13, 1976

Related U.S. Patent Documents

Reissue of:

[64] Patent No.: 3,810,572
Issued: May 14, 1974
Appl. No.: 307,415
Filed: Nov. 17, 1972

[51] Int. Cl.[2] ..... B25C 1/06

[52] U.S. Cl. ..... 227/132; 227/131

[58] Field of Search ..... 227/131, 132

[56] References Cited

U.S. PATENT DOCUMENTS

| | | | |
|---|---|---|---|
| 1,845,617 | 2/1932 | Metcalf | 227/132 |
| 2,796,608 | 6/1957 | Johnson | 227/132 |
| 3,305,156 | 2/1967 | Khan | 227/131 |
| 3,589,588 | 6/1971 | Vaska | 227/131 |

*Primary Examiner*—Granville Y. Custer, Jr.
*Attorney, Agent, or Firm*—Hopgood, Calimafde, Kalil, Blaustein & Lieberman

[57] ABSTRACT

An automatic nailing device employs a cartridge of nails which are supplied in series beneath a spring driven hammer. An electric motor charges the spring-driven hammer after each operation.

15 Claims, 17 Drawing Figures

34
35
20
37
36
21
23
22
60
68
59
81
72
56
61
95
66
70
39
110
62
58
57
50
51
55
54
40
38
53
2
2
86
33
83
80
3
3
91
111
96
27
26
52
25
24
28
31
32
30
29

FIRING

RECHARGING

RESET

FIG. 4.
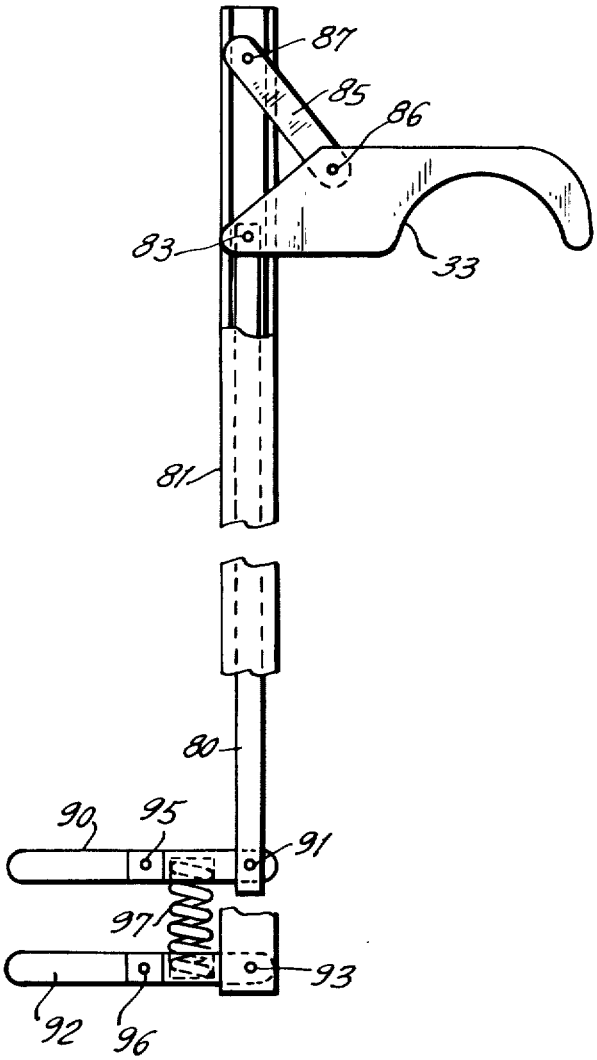
FIG. 5.
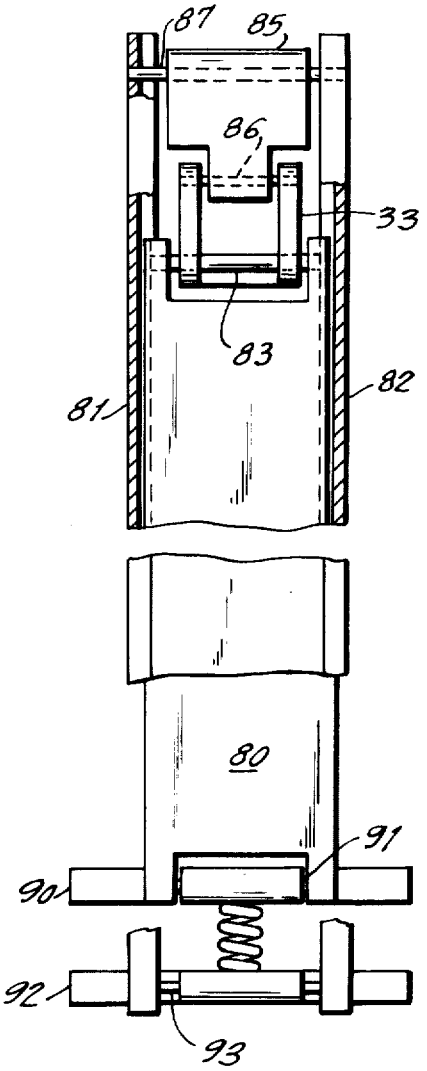
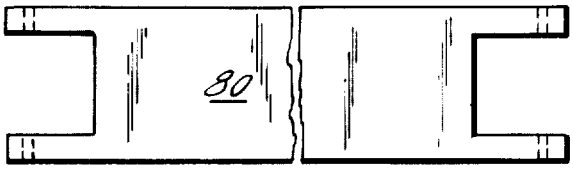
FIG. 6.
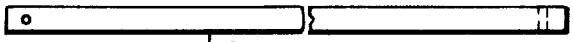
FIG. 7.
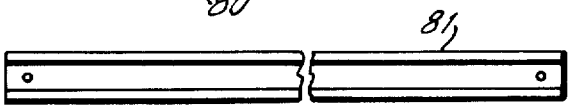
FIG. 8.
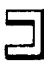
FIG. 9.

ELECTRIC NAILER

Matter enclosed in heavy brackets [ ] appears in the original patent but forms no part of this reissue specification; matter printed in italics indicates the additions made by reissue.

BACKGROUND OF THE INVENTION

This invention relates to an automatic and portable nailing device, and more specifically relates to a novel nailer which is electrically powered.

Automatic and portable nailers are well known for use at construction sites and the like. These devices, conventionally, are pneumatically powered. It would be desirable to have electrically operable nailers since it is more convenient to bring electrical power to a site than to set up the compressors needed for a pneumatically operated device. Moreover, an electrically operated device will be more easily portable than a pneumatically operated device.

BRIEF SUMMARY OF THE INVENTION

In accordance with the invention, a portable automatic nailer is provided with a spring-operated hammer which can strike nails automatically supplied from a conventional nail supply cartridge. An electric motor is built into the portable nailer and acts to charge the spring mechanism to a spring-compressed position after the nailer is operated to drive a nail from the nail supply cartridge. A novel ball latch and ball driving arrangement are operated from a manual trigger. The operation of the trigger releases the ball latch to permit the spring-charged mechanism to release the stored energy therein and drive a nail. Release of the trigger causes the electric motor to recharge the spring and the latching of the spring in its charged position.

BRIEF DESCRIPTION OF THE DRAWINGS

FIG. 4 is a plan view, partly in section, of the linkage connected to the trigger of the nailer of FIG. 1.

FIG. 5 is a side view of the linkage of FIG. 4.

FIG. 6 is a plan view of one of the links of FIGS. 4 and 5.

FIG. 7 is a side view of the link of FIG. 6.

FIG. 8 is a plan view of one of the links of FIG. 5.

FIG. 9 is a side view of the link of FIG. 8.

DETAILED DESCRIPTION OF THE DRAWINGS

Figure 1:
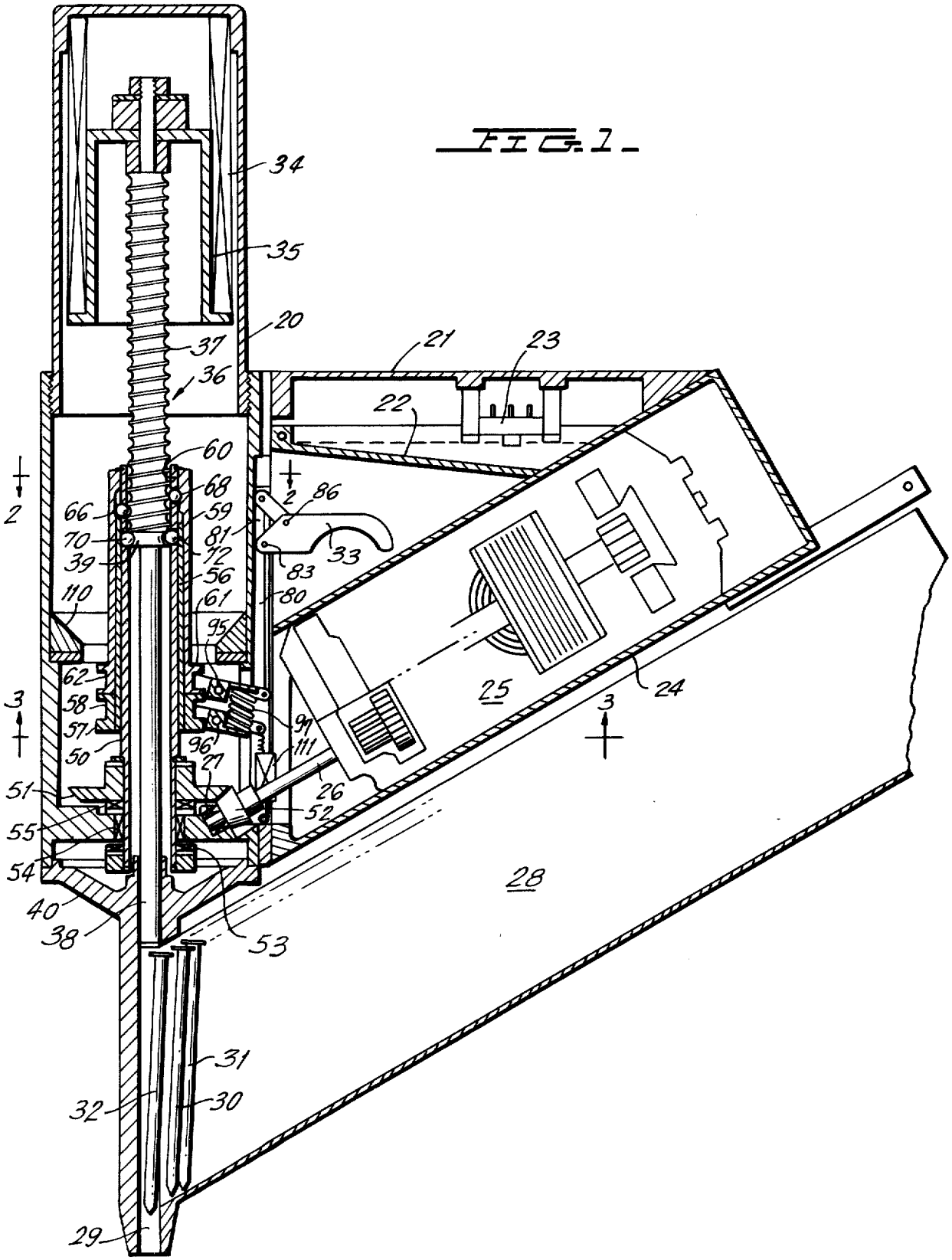
FIG. 1 is a partly cross-sectional diagram of the nailer of the present invention.

Referring first to FIG. 1, there is shown an electric and portable nailer which generally comprises a main hammer housing 20 which has a handgrip 21 secured thereto. Handgrip 21 contains a movable plate 22 which actuates microswitch 23 when a user picks up the tool. An electric motor housing 24 is connected to housing 20 and contains a suitable a-c motor 25. Motor 25 is energized from a flexible cord (not shown) which enters housing 24 and is turned on when microswitch 23 is actuated by plate 22.

A shaft 26 extends from motor 25 and is secured in bearing 27 in the lower portion of housing 20. A conventional nail cartridge 28, which slidably supports nails and delivers them one by one to cartridge end 29, is appropriately secured to housings 20 and 24. Cartridge 28 contains nails, such as nails 30 and 31, as by slidably supporting the nail heads in a suitable channel. Nail 32 is shown in a delivered position, awaiting a hammer blow.

A manual trigger 33 is then provided to actuate the hammer blow.

The upper portion of housing 20 contains a powerful compression cartridge 34 which is carried in a retaining cup 35. Cup 35 is then connected to hammer member 36 which consists of a threaded section 37 and elongated ram or hammer section 38. Note that a latching shoulder 39 (FIGS. 1, 10, 11 and 12) is formed between members 37 and 38. The bottom end of hammer 38 is slidably received in cylindrical section 40 at the bottom of housing 20.

The charging mechanism, for charging, or compressing spring 34, includes rotatable charging sleeve 50 (FIGS. 1, 10, 11 and 12) which is fixed to bevel gear 51 (FIG. 1) which is driven by cooperating gear 52 on motor shaft 26. Gear 51 and sleeve 50 are suitably rotatably mounted by bearings schematically shown as bearings 53, 54 and 55 (FIG. 1). Note that sleeve 50 rotates so long as the user holds the portable nailer and holds plate 22 against microswitch 23. Note further that sleeve 50 is fixed against axial movement.

Figure 3:
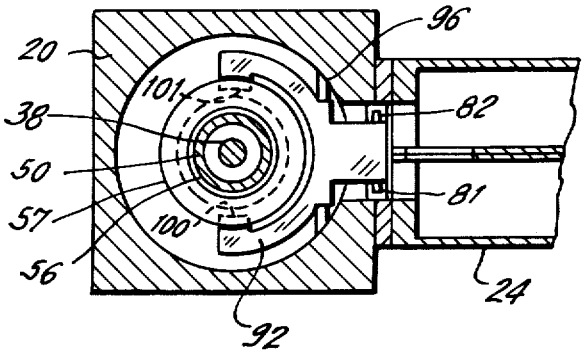
FIG. 3 is a cross-sectional view of FIG. 1 taken across section line 3 — 3 in FIG. 1.

Charging sleeve 50 is concentrically surrounded by an axially movable latching sleeve 56. The bottom of sleeve 56 is secured to a disk 57 (FIGS. 1 and 3) which contains a channel 58 in its outer periphery (FIG. 1).

Figure 2:
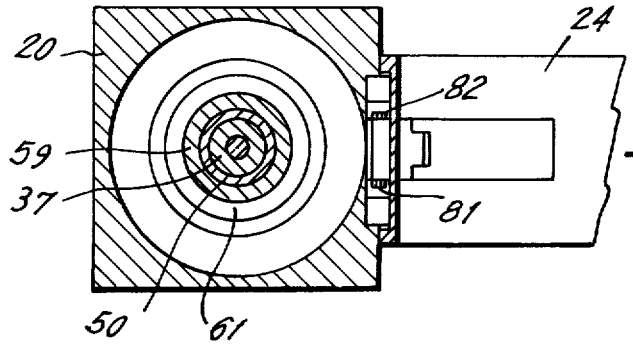
FIG. 2 is a cross-sectional view of FIG. 1 taken across section line 2 — 2 in FIG. 1.

Latching sleeve 56 is then surrounded by ball drive latching sleeve 59 (FIGS. 1 and 10 to 14) which has an internal restricted diameter portion 60. Sleeve 59 is axially movable relative to sleeves 50 and 56 and is connected at its bottom to disk 61 (FIGS. 1 and 2) which has a channel 62 in its outer periphery.

The upper end of sleeve 50 then contains apertures for receiving a series of drive balls and a series of latching balls. Thus, as best shown in FIGS. 10 to 14, sleeve 50 contains three apertures 63, 64 and 65 which are disposed in a plane parallel to the plane of the pitch of the screw 37. Apertures 63, 64 and 65 then receive balls 66, 67 and 68 which have a diameter such that the balls will fit partly into the thread forming screw 37. Therefore, when sleeve 59 is moved down to the position of FIG. 12, rotation of sleeve 50 in a clockwise direction (as seen from the top of FIG. 12) will cause the upward movement of screw 37 and hammer 38.

Sleeve 50 also contains a plurality of openings 70, 71 and 72 (FIGS. 10, 11, 12 and 14) which are in a plane perpendicular to the axis of member 36, and which receive balls 73, 74 and 75 respectively. Balls 73, 74 and have 75 have a diameter greater than that of balls 66, 67 and 68 and are adapted to latch under shoulder 39 when the apparatus is in the position of FIG. 10.

Note that any desired number of balls can be used in place of the three balls shown for sets 66, 67 and 68 and 73, 74 and 75.

The operating linkage connecting trigger 33 to sleeves 56 and 59 is best shown in FIGS. 1 and 4 to 9. These linkages are suitably supported relative to housing 20, and include elongated plate 80 which slidably receives elongated channels 81 and 82 at its outer edges. Typically, channel 81 is shown in FIGS. 8 and 9.

As shown best in FIGS. 4 and 5, the outer end of trigger 33 is pivotally connected to the upper end of member 80 by a pin 83. An intermediate point on trigger 33 receives toggle link 85 by pin 86. The opposite end of link 85 is pivotally connected to the upper ends of channels 81 and 82 by pin 87.

The lower end of plate 80 is then connected to a yoke 90 by pin 91 while the lower ends of channels 81 and 82 are connected to an identical yoke 92 by a pin 93 (FIGS. 1, 3, 4 and 5). Each of yokes 90 and 92 are pivoted on fixed pivots 95 and 96 respectively (relative to housing 20), and capture a compression spring 97 between them. Each of yokes 90 and 92 have the shape generally shown in FIG. 3 for yoke 92 and have generally Y-shaped arms which terminate in rollers, shown as rollers 100 and 101 in FIG. 3, which are captured in channel 58 in disk 57. A similar arrangement is provided for yoke 90, with its rollers engaging channel 62 of disk 61.

Note that the general arrangement described above is shown schematically in FIGS. 15 to 17.

It is now possible to describe the operation of the device, with particular reference made to FIGS. 1, 10 to 12 and 15 to 17.

Assume first that the spring 34 is charged and latching balls 73 to 75 are latched under shoulder 39, holding hammer 36 up and holding the spring 34 charged. The operator is holding the tool so that motor 25 rotates gear 51 and thus sleeve 50. Sleeve 56 is in its upward position (FIG. 10), urging balls 73 to 75 under shoulder 39 and sleeve 59 is in its upward position of FIGS. 1 and 10, so that driving balls 66 to 68 are moved outwardly by the rotation of sleeve 50 and out of engagement with screw 37. In addition, a nail 32 is in driving position at the bottom of the device.

Figure 15:
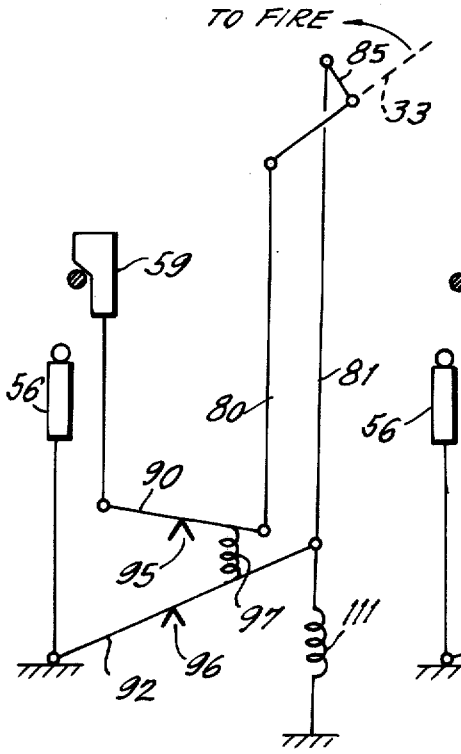
FIGS. 15 to 17 are schematic diagrams of the control linkages of FIG. 1 in the firing, recharging and reset positions respectively.
Figure 11:
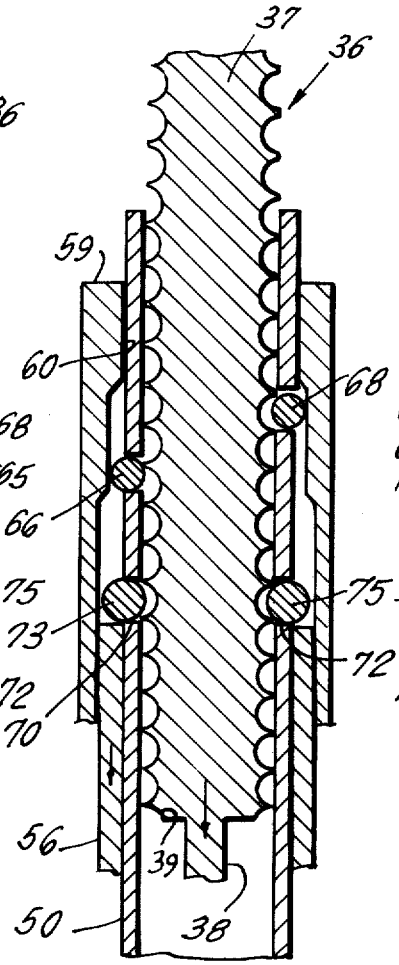
FIG. 11 is similar to FIG. 10 and shows the hammer in its unlatched and nail-driving condition.
Figure 12:
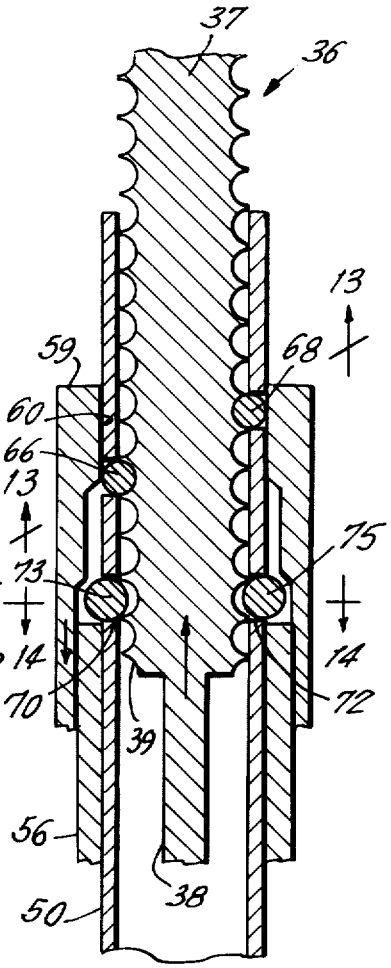
FIG. 12 is similar to FIGS. 10 and 11, and shows the hammer being moved to its charged condition.
Figure 13:
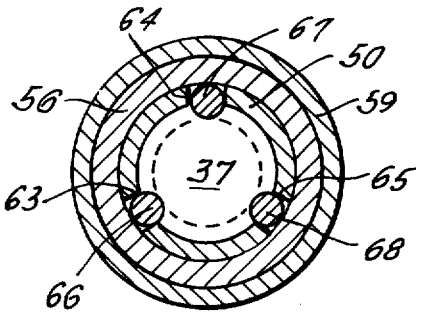
FIG. 13 is a cross-sectional view of FIG. 12 taken across section line 13 — 13 in FIG. 12.
Figure 14:
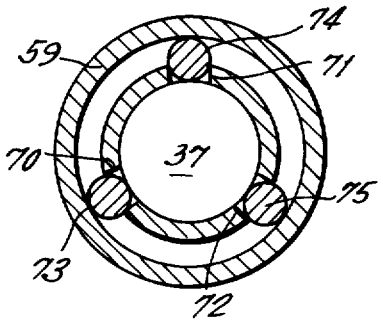
FIG. 14 is a cross-sectional view of FIG. 12 taken across section line 14 — 14 in FIG. 12.

To fire the device, the operator pulls trigger 33, rotating it counterclockwise about pivot pin 83. Note that this movement extends the biasing spring 111 (FIGS. 1, 15, 16 and 17). As shown in FIGS. 11 and 15, this movement causes yoke 92 to rotate counterclockwise to lower sleeve 56. This enables latching surface 39 to cam latching balls 73 to 75 outwardly to release hammer 36. Hammer 36 then moves downwardly, discharging the energy stored in spring 34 to apply a hammer blow to nail 32 to drive the nail. Note that a shock-absorbing ring 110 receives the bottom of cage 35 to stop its downward stroke.

Figure 16:
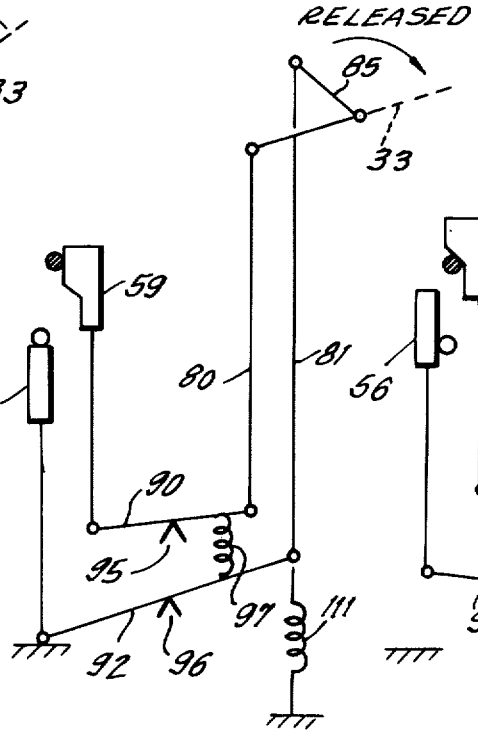
Figure 17:
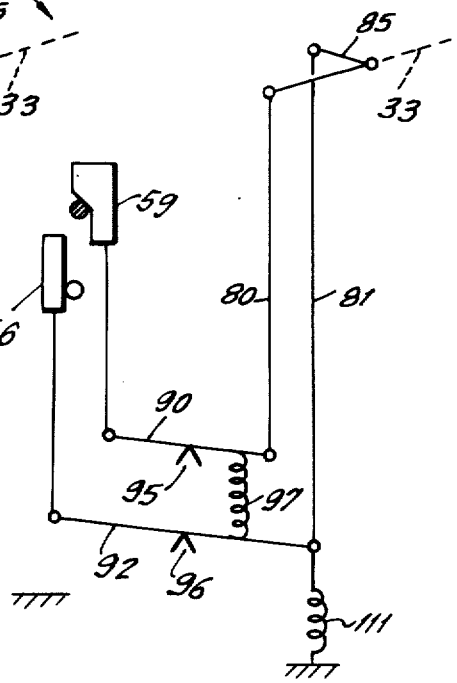
Figure 10:
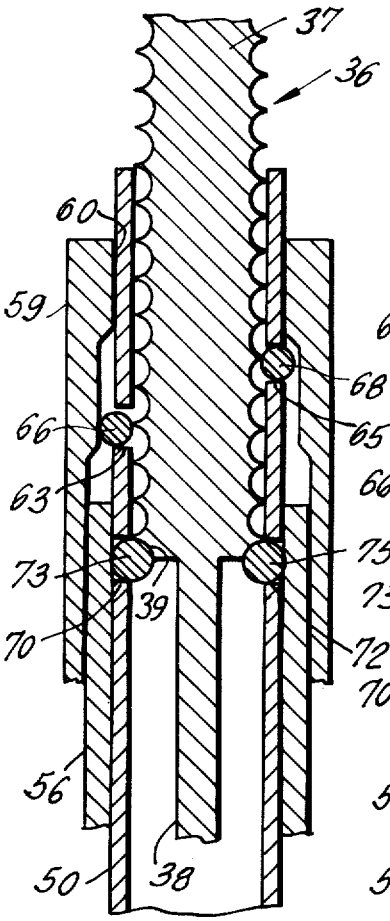
FIG. 10 is a cross-sectional view of the latching and driving balls of FIG. 1 with the device in its spring-charged position.

After the nail has been driven, trigger 33 is released as shown in FIG. 16. This causes linke 80 to move up and yoke 90 to rotate counterclockwise (under the influence of spring 97). This motion of yoke 90 moves sleeve 59 down to the position of FIGS. 12 and 16 to force drive balls 66 to 68 into the threads of threaded member 36. The rotation of sleeve 50 then causes balls 66 to 68 to drive threaded shaft 37 upwardly relative to sleeve 50, thereby to compress spring 34. Once the latching surface 39 clears the top of balls 73 to 75, these balls are forced to move under surface 39 by sleeve 56 which is being biased upwardly by spring 111. Thus, once the main spring 34 is charged, both yokes 90 and 92 rotate to the reset position of FIGS. 10 and 17 to latch the hammer 37 in position and to move sleeve 59 upward to release balls 66 to 68 from their driving relation with threaded portion 37 of the hammer. The system is now in position for the next automatic hammering operation by operation of trigger 33.

Although there has been described a preferred embodiment of this invention, many variations and modifications will now be apparent to those skilled in the art. Therefore, this invention is to be limited, not by the specific disclosure herein, but only by the appended claims.

I claim:

1. An electrically operable portable nailing device comprising, in combination:

elongated axially movable hammer means;

energy storage spring means connected to said hammer means for delivering operating force to said hammer means;

latch means for latching said energy storage means in a stored energy condition;

trigger means for defeating said latch means to permit said energy storage spring means to operate said hammer means;

nail delivery means for delivering nails to be driven to said hammer means;

an electrical motor, and a spring charging mechanism for coupling said electrical motor to said energy storage spring means to enable charging of said energy storage spring means when said latch means is defeated; said spring charging mechanism including a rotating sleeve having a plurality of charging balls trapped therein, and wherein said elongated hammer means includes an externally threaded region engageable by said charging balls, whereby rotation of said sleeve causes said balls to drive said hammer means in a spring charging direction.

2. The device of claim 1 which further includes a second sleeve concentric with said rotating sleeve; said second sleeve having an inner annular recess and being axially movable from a position pressing said balls into engagement with said threaded region to a position allowing said balls to move into said annular recess and out of engagement with said threaded region.

3. The device of claim 2 wherein said second sleeve is operatively connected to said trigger means and is moved to said position pressing said balls into said threaded region after said trigger means is released.

4. The device of claim 1 which further includes a plurality of latching balls and wherein said elongated hammer means includes a latching shoulder engageable by said latching balls; said latching balls latching under said latching shoulder after said energy storage spring means is fully charged.

5. The device of claim 4 which further includes a latching sleeve disposed concentrically about said rotating sleeve and being axially movable to hold said latching balls under said shoulder, and to release said latching balls; said latching sleeve being operatively connected to said trigger means and being moved to release said latching balls when said trigger means is operated.

6. The device of claim 2 which further includes a plurality of latching balls and wherein said elongated hammer means includes a latching shoulder engageable by said latching balls; said latching balls latching under said latching shoulder after said energy storage spring means is fully charged.

7. The device of claim 3 which further includes a plurality of latching balls and wherein said elongated hammer means includes a latching shoulder engageable by said latching balls; said latching balls being trapped in said rotating sleeve, whereby said latching balls latch under said latching shoulder after said energy storage spring means is fully charged.

8. The device of claim 6 which further includes a latching sleeve disposed concentrically about said rotating sleeve and being axially movable to hold said latching balls under said shoulder, and to release said latching balls; said latching sleeve being operatively connected to said trigger means and being moved to release said latching balls when said trigger means is operated.

9. The device of claim 7 which further includes a latching sleeve disposed concentrically about said rotating sleeve and being axially movable to hold said latching balls under said shoulder, and to release said latching balls; said latching sleeve being operatively connected to said trigger means and being moved to release said latching balls when said trigger means is operated.

10. An electrically operable impact device comprising, in combination:

elongated axially movable hammer means;

energy storage spring means connected to said hammer means for delivering operating force to said hammer means;

latch means for latching said energy storage means in a stored energy condition;

trigger means for defeating said latch means to permit said energy storage spring means to operate said hammer means;

an electrical motor, and a spring charging mechanism for coupling said electrical motor to said energy storage spring means to enable charging of said energy storage spring means when said latch means is defeated; said spring charging mechanism including a rotating sleeve having a plurality of charging balls trapped therein, and wherein said elongated hammer means includes an externally threaded region engageable by said charging balls, whereby rotation of said sleeve causes said balls to drive said hammer means in a spring charging direction.

11. The device of claim 10 which further includes a second sleeve concentric with said rotating sleeve; said second sleeve having an inner annular recess and being axially movable from a position pressing said balls into engagement with said threaded region to a position allowing said balls to move into said annular recess and out of engagement with said threaded region.

*12. An electrically operable portable hammer device comprising, in combination:*

*elongated axially movable hammer means;*

*energy storage means connected to said hammer means for delivering operating force to said hammer means;*

*an electrical motor, and a charging mechanism for coupling said electrical motor to said energy storage means to enable charging of said energy storage means to a predetermined charged condition, said charging mechanism including a rotating sleeve having a plurality of charging balls trapped therein, and*

*wherein said elongated hammer means includes a threaded region engageable by said charging balls, whereby rotation of said sleeve causes said balls to drive said hammer means to change the energy storage means to said predetermined charged condition;*

*latch means for latching said energy storage means in said predetermined position; and*

*trigger means for defeating said latch means to permit said energy storage means to operate said hammer means.*

*13. The device of claim 12 which further includes a second sleeve concentric with said rotating sleeve; said second sleeve having an inner annular recess and being axially movable from a position pressing said balls into engagement with said threaded region to a position allowing said balls to move into said annular recess and out of engagement with said threaded region.*

*14. The device of claim 12 which further includes a plurality of latching balls and wherein said elongated hammer means includes a latching shoulder engageable by said latching balls; said latching balls latching under said latching shoulder when said energy storage means is in said predetermined charged condition.*

*15. The device of claim 14 which further includes a latching sleeve disposed concentrically about said rotating sleeve and being axially movable to hold said latching balls under said shoulder, and to release said latching balls; said latching sleeve being operatively connected to said trigger means and being moved to release said latching balls when said trigger means is operated.*

* * * * *